(12) United States Patent
Ranaudo

(10) Patent No.: US 6,751,909 B2
(45) Date of Patent: Jun. 22, 2004

(54) AUTOMATIC DOOR CONTROL SYSTEM

(75) Inventor: Anthony R. Ranaudo, Bethlehem, CT (US)

(73) Assignee: The Stanley Works, New Britain, CT (US)

( * ) Notice: Subject to any disclaimer, the term of this patent is extended or adjusted under 35 U.S.C. 154(b) by 1 day.

(21) Appl. No.: 10/060,377

(22) Filed: Feb. 1, 2002

(65) Prior Publication Data

US 2002/0104266 A1 Aug. 8, 2002

Related U.S. Application Data

(60) Provisional application No. 60/266,454, filed on Feb. 6, 2001.

(51) Int. Cl.⁷ ............................................. E06B 3/00
(52) U.S. Cl. ............................................ 49/506; 49/334
(58) Field of Search .................... 49/141, 333, 334, 49/335, 506

(56) References Cited

U.S. PATENT DOCUMENTS

| | | |
|---|---|---|
| 507,269 A | 10/1893 | Hicks et al. |
| 572,301 A | 12/1896 | Hicks et al. |
| 887,530 A | 5/1908 | Scott et al. |
| 1,269,545 A | 6/1918 | Mengedoht |
| 1,716,156 A | 6/1929 | Tracy |
| 1,859,364 A | 5/1932 | Haskell |
| 1,891,359 A | 12/1932 | Rowntree |
| 1,949,645 A | 3/1934 | Conklin |
| 2,024,300 A | 12/1935 | Miller |
| 2,091,388 A | 8/1937 | Dorsey |
| 2,243,914 A | 6/1941 | Martin et al. |
| 2,276,338 A | 3/1942 | Potter et al. |
| 2,639,142 A | 5/1953 | Morgan et al. |
| 2,739,808 A | 3/1956 | Carlson |
| 3,084,927 A | 4/1963 | Linder |
| 3,284,950 A | 11/1966 | Gute |
| 3,344,555 A | 10/1967 | Hugle |
| 3,534,500 A | 10/1970 | Boehm et al. |
| 3,645,042 A | 2/1972 | Bolli |
| 3,864,875 A | 2/1975 | Hewitt |
| 3,874,117 A | 4/1975 | Boehm |
| 3,886,425 A | 5/1975 | Weiss |
| 3,948,000 A | 4/1976 | Pedersen |

(List continued on next page.)

FOREIGN PATENT DOCUMENTS

| | | |
|---|---|---|
| DE | 1 128 325 | 4/1962 |
| DE | 2 330 431 | 6/1973 |
| DE | 2 600 150 | 7/1976 |
| DE | 2 649 435 | 5/1977 |
| FR | 1 425 479 | 12/1965 |
| GB | 2 350 735 A | 12/2000 |
| JP | 5-93485 | 4/1993 |
| JP | 8-223950 | 8/1996 |
| JP | 2000-168446 | 6/2000 |
| SU | 685 798 | 9/1979 |

*Primary Examiner*—Jerry Redman
(74) *Attorney, Agent, or Firm*—Pillsbury Winthrop LLP (57) ABSTRACT

The present invention discloses an automatic door systems related to a fail safe method of controlling an automatic door operating system. One aspect of the present invention provides a method for controlling an electric motor of an automatic door system, the motor being operatively connected to a door panel to enable the motor to perform a door moving operation wherein the motor moves the door panel between the open and closed positions thereof using an electric power signal delivered to the motor from an electric power supply. Another aspect of the present invention provides a machine readable medium encoded with a plurality of machine executable instruction sequences for performing a method for controlling an electric motor of an automatic door system. Another aspect of the invention provides a control system for an automatic door system, the automatic door system including a door panel mounted for movement during a door moving operation between open and closed positions.

15 Claims, 9 Drawing Sheets

U.S. PATENT DOCUMENTS

| | | | | |
|---|---|---|---|---|
| 4,007,557 A | | 2/1977 | Davis et al. | |
| 4,339,843 A | | 7/1982 | Burnett et al. | |
| 4,348,835 A | | 9/1982 | Jones et al. | |
| 4,365,442 A | | 12/1982 | Speer | |
| 4,429,490 A | | 2/1984 | Zunkel | |
| 4,429,491 A | | 2/1984 | Bruns | |
| 4,501,090 A | | 2/1985 | Yoshida et al. | |
| 4,551,946 A | | 11/1985 | Yoshida et al. | |
| 4,563,625 A | | 1/1986 | Kornbrekke et al. | |
| 4,658,545 A | | 4/1987 | Ingham et al. | |
| 4,660,324 A | | 4/1987 | Nyenbrink | |
| 4,727,679 A | | 3/1988 | Kornbrekke et al. | |
| 4,924,626 A | | 5/1990 | Ts'ao | |
| 4,952,080 A | | 8/1990 | Boiucaner et al. | |
| 5,018,304 A | | 5/1991 | Longoria | |
| 5,036,620 A | * | 8/1991 | Beran et al. | 49/141 |
| 5,040,331 A | | 8/1991 | Merendino et al. | |
| 5,050,346 A | | 9/1991 | Eccleston | |
| 5,095,654 A | | 3/1992 | Eccleston | |
| 5,375,374 A | | 12/1994 | Rohraff, Sr. | |
| 5,386,885 A | | 2/1995 | Bunzl et al. | |
| 5,507,120 A | | 4/1996 | Current | |
| 5,513,467 A | | 5/1996 | Current et al. | |
| 5,515,649 A | | 5/1996 | Strab | |
| 5,581,944 A | * | 12/1996 | Kornbrekke et al. | 49/28 |
| 5,621,295 A | * | 4/1997 | Vanderschaeghe et al. | 318/753 |
| 5,634,296 A | | 6/1997 | Hebda | |
| 5,663,620 A | | 9/1997 | Mizuno et al. | |
| 5,771,635 A | | 6/1998 | Skinner | |
| 5,878,530 A | | 3/1999 | Eccleston et al. | |
| 5,881,497 A | | 3/1999 | Borgardt | |
| 5,930,954 A | | 8/1999 | Hebda | |
| 5,956,249 A | | 9/1999 | Beran et al. | |
| 6,002,217 A | | 12/1999 | Stevens et al. | |
| 6,006,475 A | | 12/1999 | Schwantes et al. | |
| 6,067,753 A | | 5/2000 | Hebda | |
| 6,108,975 A | | 8/2000 | Bailey | |
| 6,481,160 B1 | * | 11/2002 | Kowalczyk | 49/335 |

* cited by examiner

AUTOMATIC DOOR CONTROL SYSTEM

The present application claims priority to U.S. Provisional Application of Anthony Ranaudo, Application No. 60/266,454, filed Feb. 6, 2001, the entirety of which is hereby incorporated into the present application by reference.

FIELD OF THE INVENTION

The present invention is generally related to automatic door systems and more particularly related to a fail safe method of controlling an automatic door operating system.

BACKGROUND AND SUMMARY OF THE INVENTION

Automatic door operating systems are frequently used in commercial, industrial, and residential settings for power operated opening and closing of interior or exterior door panels. A door operating system may include an electric motor that is operatively connected to a door panel of a door assembly by a linkage assembly. Door panel movement in opening and closing directions may be affected by energizing the electric motor to drive the same in a selected direction and at a selected speed. A control system may be included in the automatic door operating system to control the electric motor and thereby control door panel movement.

The control system monitors door panel movement and stops the door panel movement when the control system detects a predetermined condition. A predetermined condition may occur when a door panel reaches an end of its travel cycle (that is, when it is fully open or fully closed) or when the door panel encounters an obstruction. The control system stops door panel movement by de-energizing the electric motor. Because door panels are often operated automatically to allow persons to pass through the associated doorway, it is important that the door panel stop when the control system attempts to de-energize the electric motor.

To ensure that the door panel stops during an attempt to de-energize the motor, one aspect of the present invention provides a method for controlling an electric motor of an automatic door system, the motor being operatively connected to a door panel to enable the motor to perform a door moving operation wherein the motor moves the door panel between the open and closed positions thereof using an electric power signal delivered to the motor from an electric power supply. The motor is communicated to a motor controller that controls the electric power signal delivered to the motor to control the door moving operation. The door system includes a switch connected between the motor and the motor controller, the switch being movable between (a) an open position disabling the delivery of the electric power signal from the motor controller to the motor and (b) a closed position enabling the delivery of the electric power signal from the motor controller to the motor. The method comprises (1) while the motor controller is delivering the electric power signal to the motor to affect the door moving operation, monitoring the door moving operation for an occurrence of a predetermined condition and (2) responsive to detecting the occurrence of the predetermined condition, (a) instructing the motor controller to terminate the delivery of the electric power signal from the electric power supply to the door operator and (b) affecting movement of the switch from the closed position thereof to the open position thereof to ensure termination of the delivery of the electric power signal in the event the electric power signal is not terminated by the controller. These acts (a) and (b) may be performed simultaneously or in any order.

The method may be carried out using a computer processor. The processor may be programmed with computer code that includes instructions for controlling and monitoring door panel movement. Accordingly, another aspect of the present invention provides a machine readable medium encoded with a plurality of machine executable instruction sequences for performing a method for controlling an electric motor of an automatic door system. The motor is operatively connected to a door panel to enable the motor to perform a door moving operation wherein the motor moves the door panel between the open and closed positions thereof using an electric power signal delivered to the motor from an electric power supply. The motor is communicated to a motor controller that controls the electric power signal delivered to the motor to control the door moving operation. The door system includes a switch connected between the motor and the motor controller, the switch being movable between (a) an open position disabling the delivery of the electric power signal from the motor controller to the motor and (b) a closed position enabling the delivery of the electric power signal from the motor controller to the motor. The automatic door system further includes a processor communicated to the motor controller. The processor is adapted to execute the instruction sequences. The instruction sequences comprise (1) while the motor controller is delivering the electric power signal to the motor to affect the door moving operation, monitoring the door moving operation for an occurrence of a predetermined condition and (2) responsive to detecting the occurrence of the predetermined condition, (a) instructing the motor controller to terminate the delivery of the electric power signal from the electric power supply to the door operator and (b) affecting movement of the switch from the closed position thereof to the open position thereof to ensure termination of the delivery of electric power signal in the event the electric power signal is not terminated by the controller. The executable instructions may be provided so that the acts (a) and (b) are performed simultaneously or in any order.

Other aspects of the invention provide an automatic door system comprising a door panel mounted for movement between open and closed positions and an electric motor. The motor is operatively interconnected to the door panel to enable the motor to perform a door moving operation wherein the motor moves the door panel between the open and closed positions thereof using an electric power signal delivered to the motor from an electric power supply. A control system comprises (1) a motor controller is communicated to the motor, the motor controller being operable to control the delivery of the electric power signal to the motor to control the door moving operation and (2) a switch is connected between the motor and the controller, the switch being movable between (a) an open position disabling the delivery of the electric power signal from the motor controller to the motor and (b) a closed position enabling the delivery of the electric power signal from the motor controller to the motor. The control system is operable to (1) monitor the door moving operation to detect the occurrence of a predetermined condition while the motor controller is delivering the electric power signal to the motor to affect the door moving operation and (2) in response to detecting the occurrence of the predetermined condition, (a) instruct the motor controller to terminate the delivery of the electric power signal from the power supply to the motor and (b) affect movement of the switch from the closed position thereof to the open position thereof to ensure termination of the delivery of the electric power signal to the motor in the event the electric power signal is not terminated by the controller.

Another aspect of the invention provides a control system for an automatic door system, the automatic door system including a door panel mounted for movement during a door moving operation between open and closed positions. The control system comprises an electric motor operatively connected to the door panel to enable the motor to perform the door moving operation wherein the motor drives the door panel between the open and closed positions thereof using an electric power signal delivered to the motor from an electric power supply. The control system further comprises a motor controller electrically communicated to the motor and to the power supply, the motor controller being operable to control the electric power signal delivered to the motor and thereby control operation of the motor. The control system further includes a switch connected between the motor and the motor controller. The switch is movable between (a) an open position disabling the delivery of the electric power signal from the motor controller to the motor and (b) a closed position enabling the delivery of the electric power signal from the motor controller to the motor. The control system is operable to (1) monitor the door moving operation to detect the occurrence of a predetermined condition while the motor controller is delivering the electric power signal to the motor to affect the door moving operation and, (2) in response to detecting the occurrence of the predetermined condition, (a) instruct the motor controller to terminate the delivery of the electric power signal from the power supply to the motor and (b) affect movement of the switch from the closed position thereof to the open position thereof to ensure termination of the delivery of the electric power signal to the motor in the event the electric power signal is not terminated by the controller.

Other objects, features, and advantages of the present invention will become apparent from the following detailed description, the accompanying drawings, and the appended claims.

DETAILED DESCRIPTION OF THE INVENTION

Figure 1:
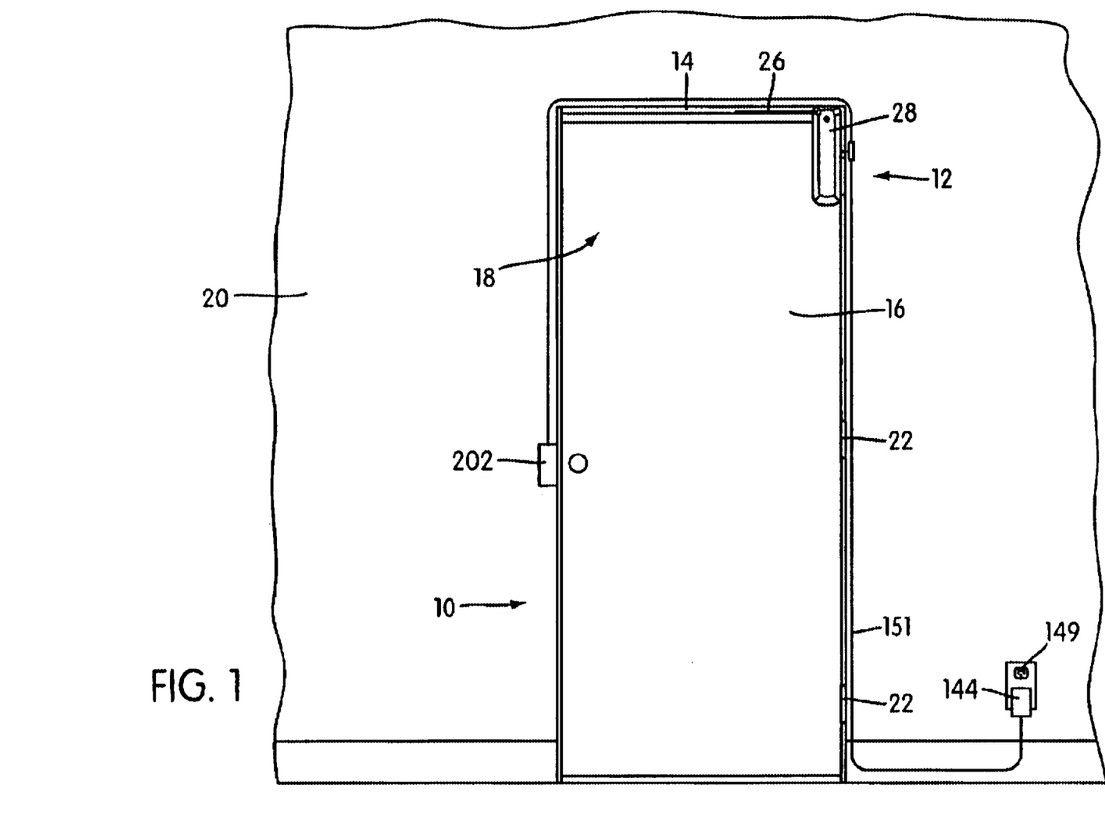
FIG. 1 shows a door assembly mounted on a building wall shown in fragmentary view and an automatic door operating system operatively mounted between a door panel and a door frame of the door assembly.

FIG. 1 shows a door assembly 10 and a control system 12 operatively engaged with the door assembly 10. The door assembly 10 includes a door frame 14 and a door panel 16. The door frame 14 is mounted around the periphery of a door opening 18 formed in a building wall 20. The exemplary door panel 16 is mounted to the door frame 14 by hinges 22 for swinging movement with respect to the door frame 14 between open and closed positions. Together, the control system 12 and the door assembly 10 may be considered an automatic door system.

Figure 2:
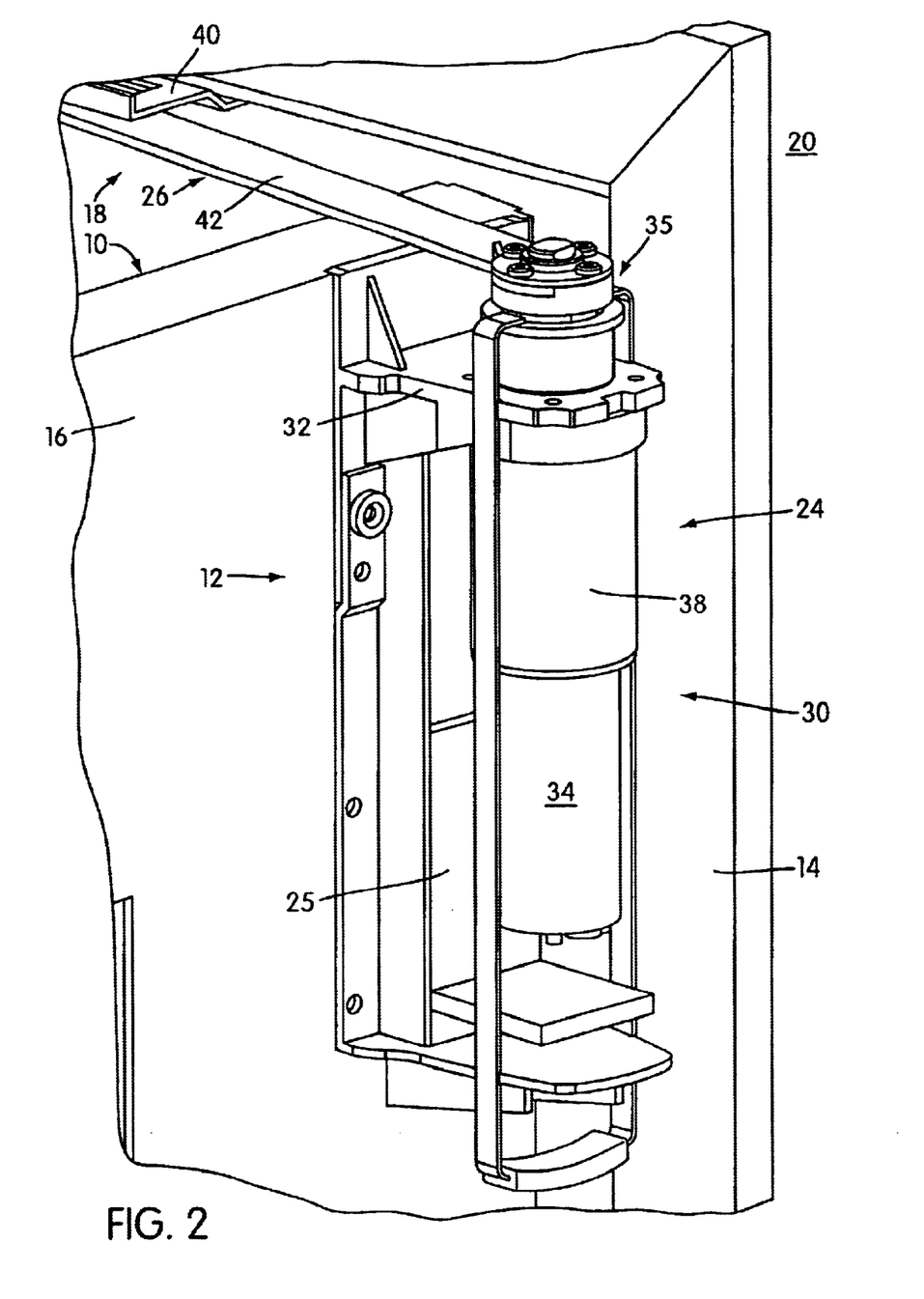
FIG. 2 shows an enlarged fragmentary view of the door assembly with the door panel thereof in a partially open position and showing the power assembly with a cover structure thereof removed and not shown to show the structure thereof.

The illustrated door assembly 10 is of the type typically found on either an interior or exterior wall of a commercial, industrial, or residential building and the illustrated door control system 12 is attached to the door assembly 10 as a retro-fit door control system. Alternatively, the principles of the present invention could be applied to a system in which the control system 12 is incorporated into the door assembly 10, such as is commonly found in the automatic door systems used in commercial storefronts and other commercial locations. The overall construction of the automatic door system, and whether it is of a retrofit or fully packaged type are not particularly important to the present invention. Instead, the present invention is primarily concerned with the method of controlling the system's motor, the machine executable instructions for controlling the system's motor, and the overall system itself. It can also be appreciated that although the exemplary door assembly shown in FIGS. 1 and 2 is of the swinging type, this illustration is not intended to limit the scope of the invention. It is contemplated to configure the control system 12 for installation on and for use in controlling slidably mounted door panels (such as, for example, door panels slidably mounted for rectilinear movement between open and closed positions with respect to the associated door frame), revolving door panels (that is, door panels mounted for movement in a revolving type door), bi-fold door systems, or any other type of door system.

The control system 12 includes a door power assembly 24 and a control module 25 (see FIG. 2). The door power assembly 24 is mounted on the door panel 16 and operatively connected with the door frame 14 by a linkage assembly 26. The structure of the door power assembly 24 can be understood from FIG. 2 which shows an enlarged view of the power assembly 24 (with a cover structure 28 of the control system 12 removed and not shown in FIG. 2) mounted on the door panel 16 (shown in a partially open position). The power assembly 24 includes an axial operator 30 mounted on the door panel 16 by a door panel mounting structure 32. The axial operator 30 includes an electric motor 34 that is operatively coupled to the linkage assembly 26 by a planet gear reduction transmission 38. The output shaft of the axial operator 30 may be connected directly to the linkage assembly 26 or, as shown in FIG. 2, the axial operator 30 may be connected to the linkage assembly 26 through a clutch assembly 35. The clutch assembly 35 is optional and is not required by the invention. The linkage assembly 26 includes a wall mounting structure 40 mounted on the door frame 14 and a linkage structure 42 operatively engaged between the wall mounting structure 40 and an output shaft of the axial operator 30.

The motor 34 acts through the transmission 38 and the linking assembly 26 to move the door panel 16 between its open and closed positions. The details of the structure of the door assembly 10 and the structure and operation of the power assembly 24 and the manner in which the power assembly 24 is operatively connected through the linkage assembly 26 with the door assembly 10 will not be considered in detail. These details are disclosed in commonly assigned Patent Application Serial No. 60/230,433 entitled RETROFIT POWER DOOR ASSEMBLY which application is hereby incorporated by reference in its entirety into the present application for all material disclosed therein.

Figure 3:
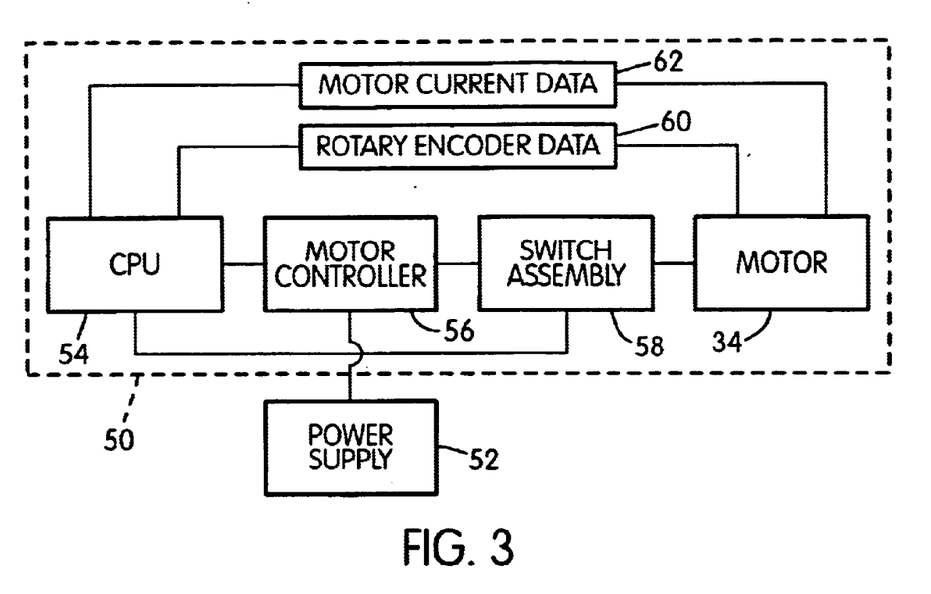
FIG. 3 shows a schematic representation of a control circuit and the power supply for the automatic door operating system.

The operation and control of the electric motor 34 is generally affected by control circuitry 50 (generally contained within the control module 25 shown mounted on the door panel 16 in FIG. 2 and shown schematically in FIG. 3) and an electric power supply 52 (also shown schematically in FIG. 3). The control circuitry 50 includes a central processing unit 54, a motor controller 56 and a switch assembly 58. The motor 34 (shown schematically in FIG. 3) is electrically communicated to the motor controller 56. The motor controller 56 generally operates to control the transmission of an electric power signal from the power supply 52 to the motor 34. The switch assembly 58 is connected between the motor controller 56 and the motor 34.

The CPU 54 may be a programmable general purpose microprocessor or any other type of processor capable of controlling the motor controller 56, irrespective of whether it is programmed by software, whether it is hardwired, or whether it is chip driven to perform its processing function. The motor controller 56 may be a pulse width modulator and the switch assembly 58 may be a relay. The pulse width modulator may be realized by an H-Bridge configuration of switches and a motor drive control module or "chip" which operates the H-Bridge. The power supply signal from the power source 52 is communicated to the motor 34 through the H-Bridge configuration of the motor controller 56. The motor control module of the motor controller 56 operates the H-Bridge configuration to produce a pulse width modulated power signal that is communicated to the motor 34. The motor drive control module is, in turn, communicated to and controlled by the CPU 54 such that the CPU 54 acting through the motor control module of the motor controller 56 controls the flow of power to the motor 34. The motor controller 56 need not be a pulse width modulator and, instead, may be any other suitable device for controlling the motor 34.

In the illustrated embodiment, the relay includes a switch element and an inductive coil, but any type of switch suitable for achieving the present invention may be used. The switch element is electrically communicated in series between the motor 34 and the H-Bridge configuration of the motor controller 56. The switch element is movable between (a) an open position disabling the delivery of the electric power signal from the motor controller 56 to the motor 34 and (b) a closed position enabling the delivery of the electric power signal from the motor controller 56 to the motor 34. The inductive coil is communicated to and controlled by the CPU 54. The CPU 54, by controlling a flow of current through the inductive coil, controls the movement of the switching element between open and closed positions and thereby controls the transmission of the electrical power signal from the power supply 52 to the motor 34. Specifically, the switch element is made of a magnetizeable material and applying an electric signal (as controlled by the CPU) creates a magnetic field that attracts the switch element to its closed position thereof. The switching element is normally biased to its open position, and thus automatically returns to its open position upon removal of the electric signal applied to the inductive coil. The CPU 54 is therefore operable to control the movement of the switching element between closed and open positions to enable and disable, respectively, the delivery of the electric power signal to the motor as aforesaid.

The CPU 54 is programmed with a series of executable instructions to control the operation of the pulse width modulator and thereby control the speed and/or direction of the motor 34 (and therefore the speed and direction of door panel 16 movement). As explained in greater detail below, while the motor controller 56 is delivering the electric power signal to the motor 34 to affect a door moving operation, the CPU 54 monitors the door movement for the occurrence of one or more predetermined conditions (such as improper motor speed or motor current). For example, the CPU 54 may monitor the motor speed and/or motor current through motor speed encoder circuitry and motor current feedback circuitry 60 and 62 (see FIG. 3), respectively, during a door moving operation and, if a predetermined condition is detected (such as if the speed of the door panel is higher or lower than expected and/or the motor current is higher than expected during a door moving operation), the CPU 54 responds by (a) instructing (or commanding) the motor controller 56 to terminate delivery of the electric power signal from the power supply 52 to the motor 34 and (b) moving the switch element in the switch assembly 58 from its closed position to its open position to ensure termination of the delivery of the electric power signal to the motor 34 in the event the electric power signal from the motor controller 56 is not terminated by the command sent from the CPU 54 to the motor controller 56.

Because the CPU 54 responds to the detection of one or more predetermined conditions during a door moving operation by commanding the motor controller 56 to stop delivering power to the motor 34 and to open the switch 58 between the motor controller 56 and the motor 34, the motor controller 56 and the switch 58 provide a redundant system for shutting off the supply of power to the motor 34 in the event a fault is detected and thereby provides fail safe operation of the control system 12.

Operation of the Automatic Door System

Generally, the door control system 12 operates by detecting an input signal generated by the actions of a person (hereafter, the "operator") operating the door system and, in response to the detected input signal, energizing the motor 34 to initiate a door opening (or door closing) operation, moving the door panel to its open (or closed) position and then de-energizing the motor 34. The CPU 54 may be programmed to respond to a variety of operator-initiated input signals by generating appropriate output signals to control operation of door panel movement, to monitor door system operation during door panel movement and to take corrective actions if a predetermined fault condition is detected during door panel movement.

Operator-initiated input signals may be provided from a variety of devices including a variety of devices that are hardwired to the CPU 54 (that is, communicated to the CPU directly from an input device such as a switch through electrical conducting members such as conventional electrical wires), such as infrared, Doppler, or microwave motion and/or presence detectors, and a variety of wireless devices, such as wireless devices that transmit signals through the use of infrared light and devices that transmit signals using higher (or lower) frequency electromagnetic radiation such as radio frequency electromagnetic radiation.

Figure 4:
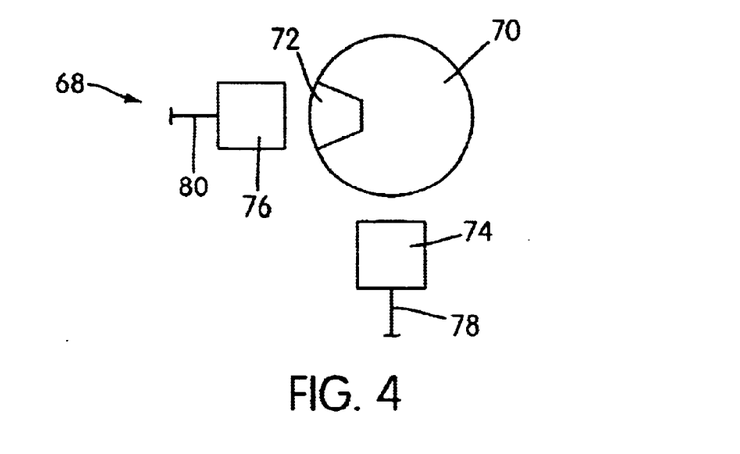
FIG. 4 shows a schematic representation of a shaft encoder of an electric motor.

The CPU 54 may monitor door movement indirectly by monitoring the rotation of the motor shaft of the electric motor 34 using, for example, a shaft encoder that may be provided as part of the motor 34. The shaft encoder may form part of the feedback circuit 60 of FIG. 3. An example of a shaft encoder 68 is shown schematically in FIG. 4. FIG. 4 shows a portion of a motor shaft 70 and a magnetic material 72 mounted within a portion of the shaft 70. A pair of magnetic field detectors 74, 76 (which may be, for example, a pair of Hall effect sensors) are mounted adjacent the shaft 70 and electrically communicated to the CPU 54 through conductors 78, 80. During the rotation of the shaft 70, movement of the magnetic material 72 past a detector 74 or 76 causes that detector 74 or 76 to generate an electrical pulse. Each pulse is communicated to the CPU 54 through conductors 78, 80.

The conductors 78, 80 may comprise the A and B channels, respectively, of a shaft encoder that send a series of pulses to the CPU 54 during rotational movement of the shaft 70 with respect to the detectors 74, 76. The pulses provide the CPU 54 with information about shaft 70 movement. The CPU 54 may use the pulses received on the A and B channels to determine (1) the speed at which the door panel 16 is moving, (2) the direction in which the door panel 16 is moving and (3) the angular distance the door panel has moved from either its open or its closed position. Specifically, the CPU 54 may be programmed to calculate the angular speed of the motor shaft 70 by, for example, measuring the time period between successive pulses on a particular channel and to use this data to calculate the angular speed of the door panel 16. The CPU 54 may be programmed to determine the direction of door panel movement by calculating the time intervals between the pulses received from the A and B channels. The CPU 54 may be programmed to determine the angular distance the door panel 16 has moved from either its open or closed position based on the total number of revolutions of the shaft 70 in either its opening or closing direction (which can be calculated by counting the total number of pulses received on either the A or the B channel) and to use this data to control door panel operation as a function of door panel position. Circuitry 62 may also be provided between the motor 34 in the CPU 54 to enable the CPU 54 to monitor the magnitude or amplitude of a current within the motor 34. The CPU 54 may be programmed to use the magnitude of the motor current in conjunction with other data to ensure that the door control system 12 operates safely.

Any device suitable for monitoring the door panel operation may be employed in place of the encoder arrangement disclosed. Thus, the invention is not intended to be limited to the exemplary encoder-type monitoring device disclosed.

Exemplary Computer Program for Fail Safe Automatic Door System Operation

Figure 5:
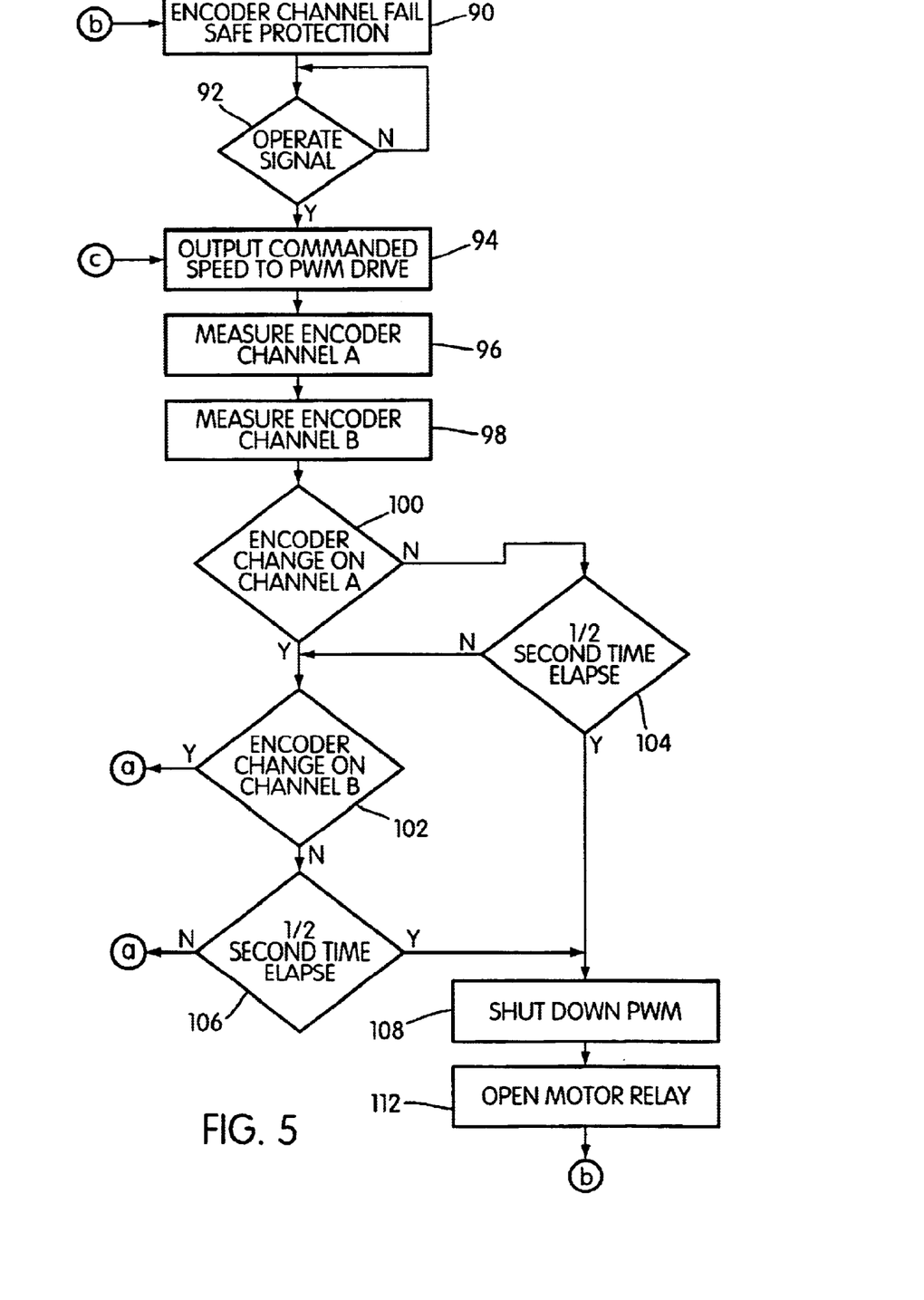
FIGS. 5 and 6 show a flowchart for a control system for the automatic door operating system.
Figure 6:
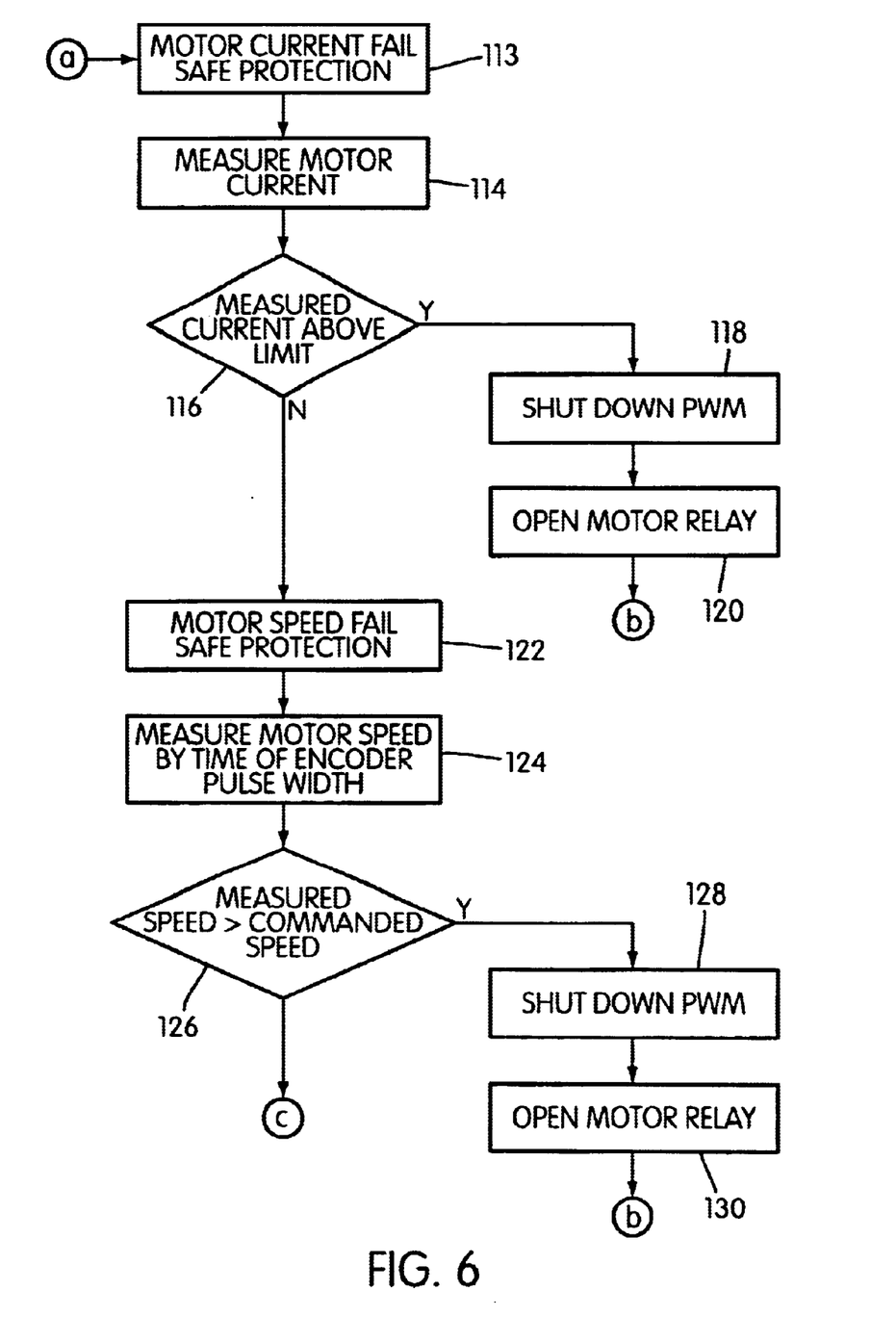

FIGS. 5 and 6 show a block diagram for an exemplary computer program that utilizes feedback data from the encoder 68 and motor current data to provide fail safe operation of the door control system 12. The program comprises a series of instructions executable by the CPU 54 and may be provided on an EPROM chip or stored in a non—volatile memory of the processor 54. Alternatively, the program may be permanently embedded in the processor as a part of its circuitry. With respect to FIG. 5, the program begins at title block 90. The motor 34 is in its off condition (so the door panel 16 is not moving) and the door panel 16 may be either fully open or fully closed at block 90. The CPU 54 waits for an operator input signal at 92. When a signal is received (from a wireless device such as a remote control key fob, for example) the CPU 54, in response, sends control signals to the motor controller 56 (which may be, for example, a pulse width modulator) and to the switch 58 (which may be, for example, a relay) at 94. These control signals cause the pulse width modulator 56 to generate a power signal to drive the same at a selected speed and in a selected direction (as determined by the CPU 54) and may cause the switch element in the relay 58 to close, thereby enabling the power signal generated by the pulse width modulator 56 to be communicated to the motor 34.

The CPU 54 measures the encoder pulses on channels A and B at 96 and 98, respectively. At 100, the CPU 54 determines if a pulse has been detected on channel A. If there has not been a detected pulse (that is, if there has been no change in signal level on channel A), the CPU 54 determines whether or not there has been a detected pulse within the past half second (the CPU 54 may be programmed so that this time period is variable) at 104. If there has been no change in signal level on channel A but less than half of second has passed since the last detected signal level or since door opening (or closing) movement has been initiated, program execution proceeds to 102 to determine whether or not there has been a detected change in signal level on channel B. If there has been a detected change in signal level on channel B at 102, program execution proceeds to block 113 (FIG. 6). If there has been no change in signal level on channel B at 102, program execution proceeds to 106 to determine whether less than half of second has passed since the last detected signal level or since door opening (or closing) has been initiated. If a half second has not elapsed since the last detected signal on channel B (or since door movement was initiated), program execution proceeds to block 113 (FIG. 6). If there is no detected change in signal level on channel A and/or channel B for a half second or more, the CPU 54 instructs the pulse width modulator to terminate delivery of the electric power signal to the motor 34 and affects movement of the switch to its open position at 108 and 110, respectively. Blocks 96–106 in effect operate to ensure that the motor shaft begins rotation after a power-on event is commanded by an operator at block 92 and to ensure that the motor shaft rotation continues until the door is fully open (or closed). For example, if no motor shaft 70 movement is detected after a half second following the receipt of a power-on command from an operator at 92, the CPU 54 shuts down the door control system 12 because such a condition is indicative of an obstruction being present which prevents the door panel 16 from moving or for some other reason.

Block 113 is a title block. The CPU 54 measures the motor current at 114 and compares the measured motor current with the expected motor current at block 116. The expected motor current level may be a function of both door panel 16 position and of the commanded motor speed. If the CPU 54 determines at 116 that the measured motor current is above the expected value or limit, this may indicate that the door has encountered an obstruction or that an attempt is being made to move the door panel 16 manually, and the CPU 54 may respond by (1) commanding the pulse width modulator to terminate delivery of its electric power signal to the motor 34 and (2) by opening the relay switch at 118 and 120, respectively.

The CPU 54 compares the actual motor speed with the commanded motor speed at blocks 122–130. Blocked 122 is a title block. The CPU 54 may be programmed to measure the actual motor speed at 124 based on, for example, the widths of the pulses received from either the A channel or the B channel. The CPU 54 compares the measured motor speed with the target or commanded motor speed at 126. If the measured speed is greater than the commanded speed, the CPU 54 may be programmed to (1) command the pulse width modulator 56 to stop sending a power signal to the motor 34 and (2) to open the relay switch 58 (and thereby open the transmission path of the electric power signal from the motor controller 56 to the motor 34) at 128 and 130, respectively. If the measured speed is greater than the commanded speed, this may indicate that a person is attempting to manually move the door panel 16 (in the same direction in which the motor 34 is moving it) or that the pulse width modulator 56 has malfunctioned, thus causing the door panel 16 to move faster than its commanded speed. If the measured speed is not greater than the commanded speed, program control goes back to block 94. As explained below, when the pulse width modulator is shut down and/or the relay is open, the door panel 16 is in manual mode. In manual mode, the door panel 16 is no longer being driven by the motor 34 and the door panel 16 can be moved to manually. Blocks 94–130 continue to be executed as a loop at a relatively higher rate of speed (typically many times per second depending upon several factors which may include, for example, the clock speed of the processor, the total number of instructions required to execute blocks 94–130 and the number of clock cycles required per instruction) while the door panel 16 is moving.

If the door panel 16 is allowed to move to its fully open or fully closed position, it will encounter the door frame 14 (in its closed position) or a door stop or wall (in its fully open position) which will stop door panel movement. This will result in the cessation of pulse signals on the A and B channels and/or an increase in motor current. The CPU 54 may be programmed to shut off the door control system 12 either at blocks 108 and 110 or at blocks 118 and 120 as a result. The CPU 54 may be programmed, for example, to count the total number of revolutions of the motor shaft 70 that have occurred (by counting pulses on the A channel, for example)and the CPU 54 may use this information to determine whether or not door panel movement is stopping as a result of a normal end of cycle movement of the door panel 16 against a stopping structure (such as a door frame or a door stop) or whether door panel movement is stopping because the door panel 16 has encountered an unexpected object in the middle of its range or cycle of movement. If the CPU 54 determines that the door panel is at the end of a cycle, the CPU may be programmed to ignore the rise in motor current and weight for the full half second (or other predetermined time period) before shutting down the control system 12 (to allow re-latching of the door panel in the presence of a door seal, for example).

It is understood that the control system 12 operation described in FIGS. 5 and 6 is exemplary only and not intended to limit the scope of the invention. FIGS. 5 and 6 are intended to illustrate by way of example one way in which the CPU 54 may be programmed to stop the door panel 16 from moving by commanding the pulse width modulator 56 to de-energize the motor 34 and by opening the relay 58. It can also be understood that this procedure for de-energizing the control system 12 provides fail safe door panel operation and shuts down the system 12 in the event the door panel encounters an obstruction while moving or in the event that the door panel reaches its fully open (or closed) position.

It is also contemplated to programmed the CPU 54 to shut down the door control system 12 in the event that a second or subsequent input signal is sent from the operator while the door panel 16 is moving. The CPU 54 may be programmed, for example, to stop power operated door panel 16 movement in an opening or closing direction if an operator-initiated input signal is received that requests door panel movement in the opposite direction from the direction in which the door panel is then moving. For example, if the door panel is opening and the user sends a "closed door panel" request to the CPU 54, the CPU 54 may be programmed to respond by stopping power operated door panel movement so that the door panel 16 goes into manual mode.

Exemplary Circuit for Fail Safe Automatic Door System Operation

Figure 7:
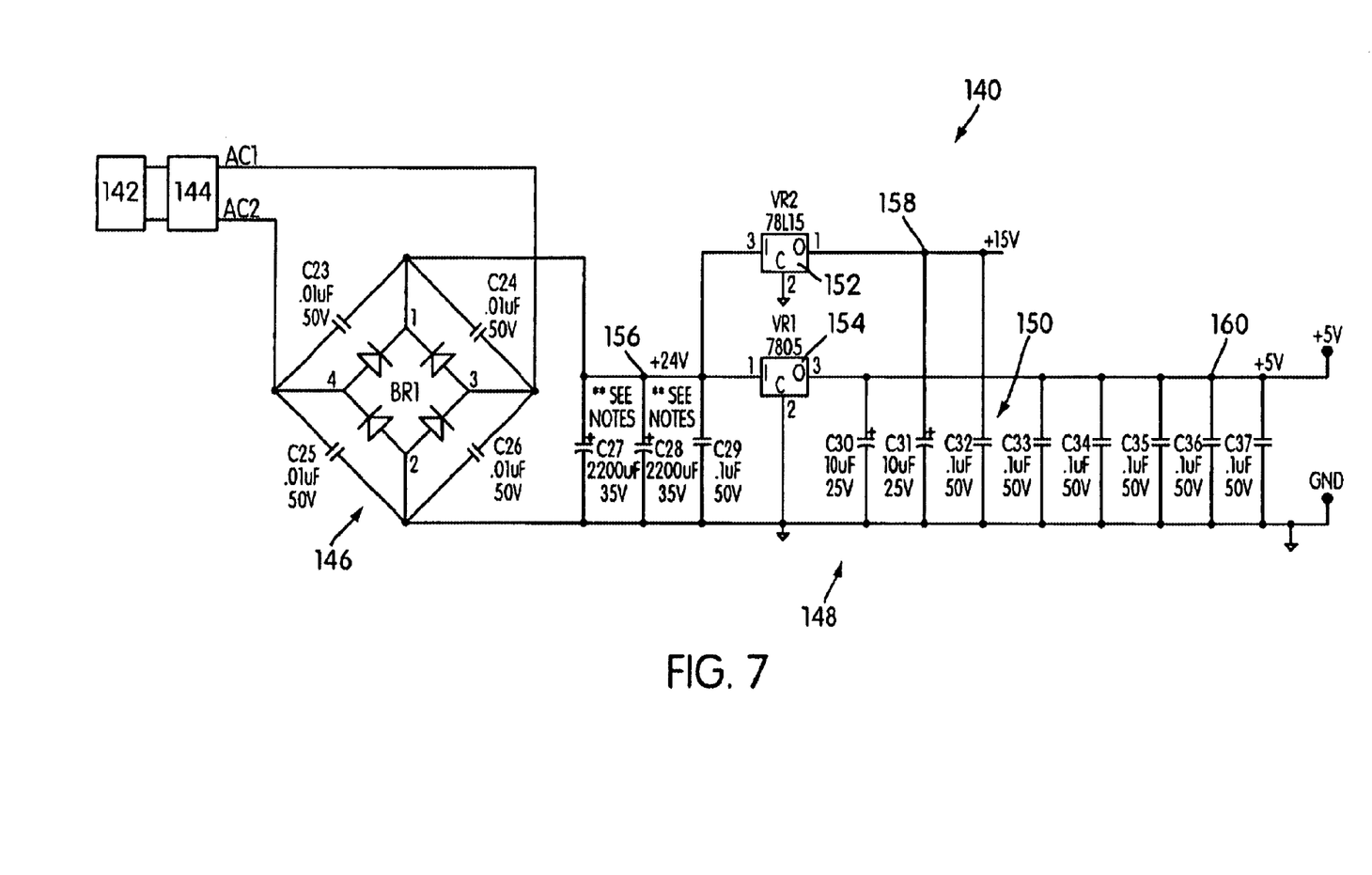
FIGS. 7 through 10 show a circuit diagram for implementing control circuitry for the automatic door operating system.

FIGS. 7–10 show an exemplary electrical circuit for implementing the fail safe door control system 12. Most of the circuitry shown in the FIGS. 7–10 may be included within the control module 25 mounted on the door panel 16 (see FIG. 2). FIG. 7 shows power supply circuitry 140 for the door control system 12. The power supply circuitry 140 includes a power source 142, a step-down transformer 144, a bridge rectifier 146 and filtering circuitry 148. A power source 142 (shown schematically in FIG. 7) may be provided by a conventional 120 volt household electrical outlet 149 (see FIG. 1) and the transformer 144 (shown schematically in FIG. 7) may be a 120 volt to a 24 volt wall mounted transformer (see FIG. 1) that is electrically communicated to the control module 25 through an electrical line 151 (FIG. 1). The rectifier 146 (FIG. 7) may be operated to rectify the AC (alternating current) power signal from the transformer 144. The filtering circuitry 148 includes a plurality of capacitors generally designated 150 and a pair of voltage regulators 152, 154 and may be operated to provide DC (direct current) voltages to power the door control system 12. For example, the circuitry 148 may provide 24 volt, 15 volt and 5 volt DC at 156, 158 and 160, respectively.

Figure 8:
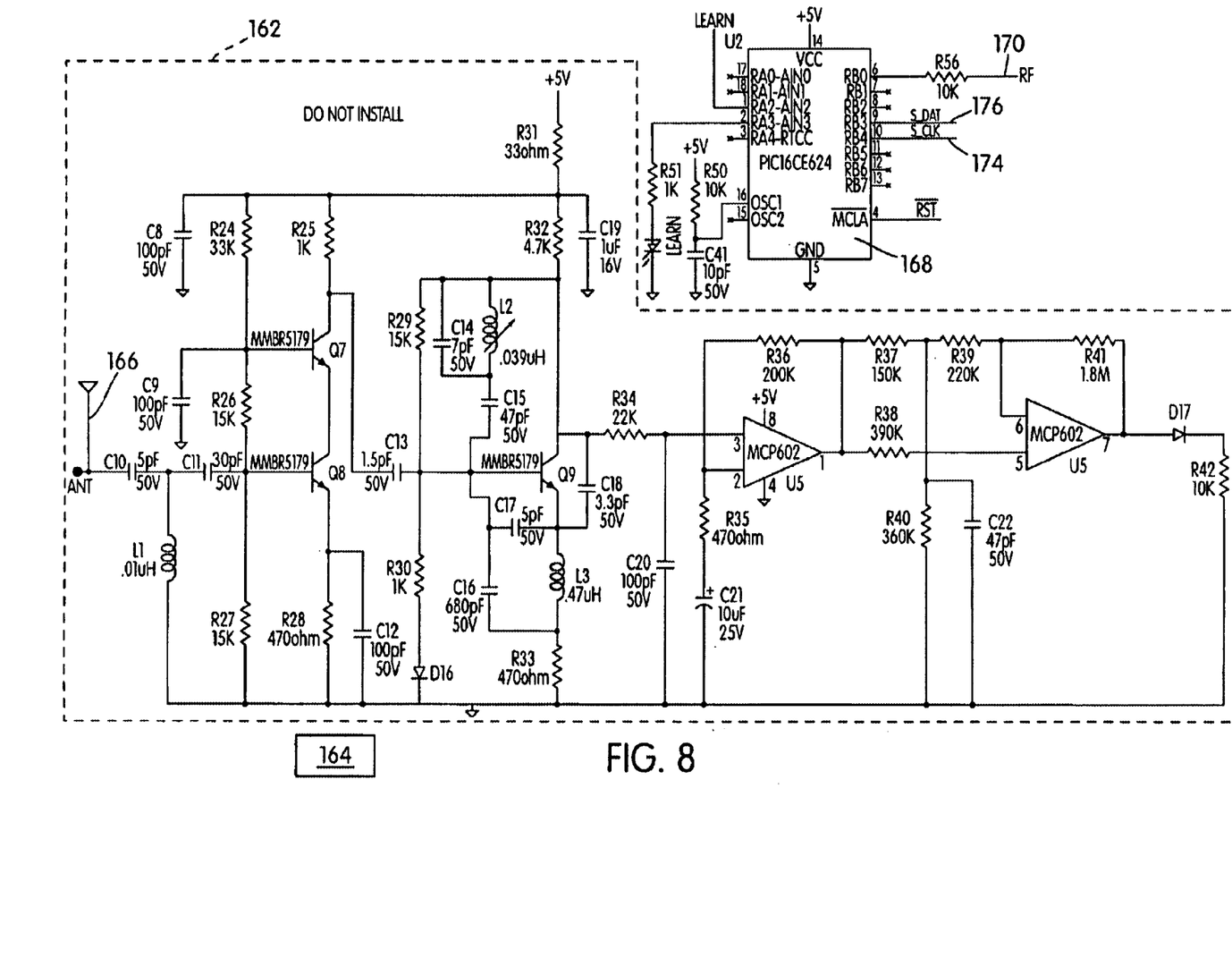

A receiver circuit 162 is shown (enclosed within dashed lines) in FIG. 8. The receiver circuit 162 may receive a signal from an operator controlled wireless remote control device such as a key fob 164 (shown schematically in FIG. 8). An operator-initiated door control signal may be received by an antenna 166 of the receiver circuit 162, processed and amplified by circuitry within the receiver 162 and sent to an associated decoder microcontroller 168 which may be electrically communicated to the receiver circuit 162 through signal line 170. Microcontroller 168 may be programmed and operated to decode the information in the received signal from the key fob 164. The signal sent from the key fob 164 may contain encoded information that includes the desired door panel moving operation requested by the operator and various control and security information. The control and security information may include a manufacturers code for the particular key fob, a unique serial number assigned to the key fob and a random code generated and emitted by each key fob transmitter which may be used to assure secure operation of the door control system 12 to prevent unauthorized users from operating the door system 12. Electrical lines 174, 176, respectively, may be communicated from the decoder microcontroller 168 to a central processing unit (CPU) 172 (see FIG. 9) of control circuitry to communicate timing (or clock) data and control data to the CPU 172.

Figure 9:
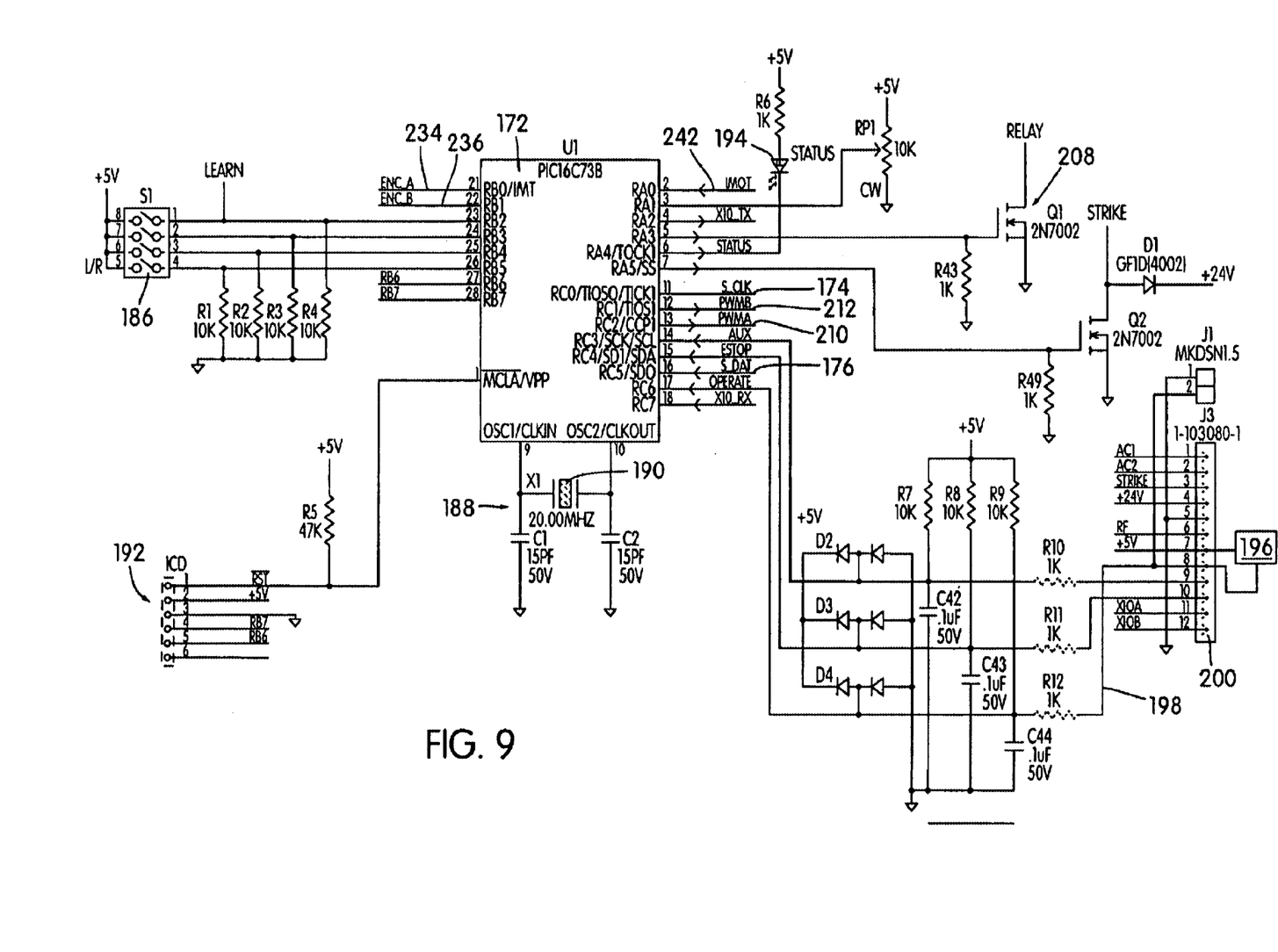
Figure 10:
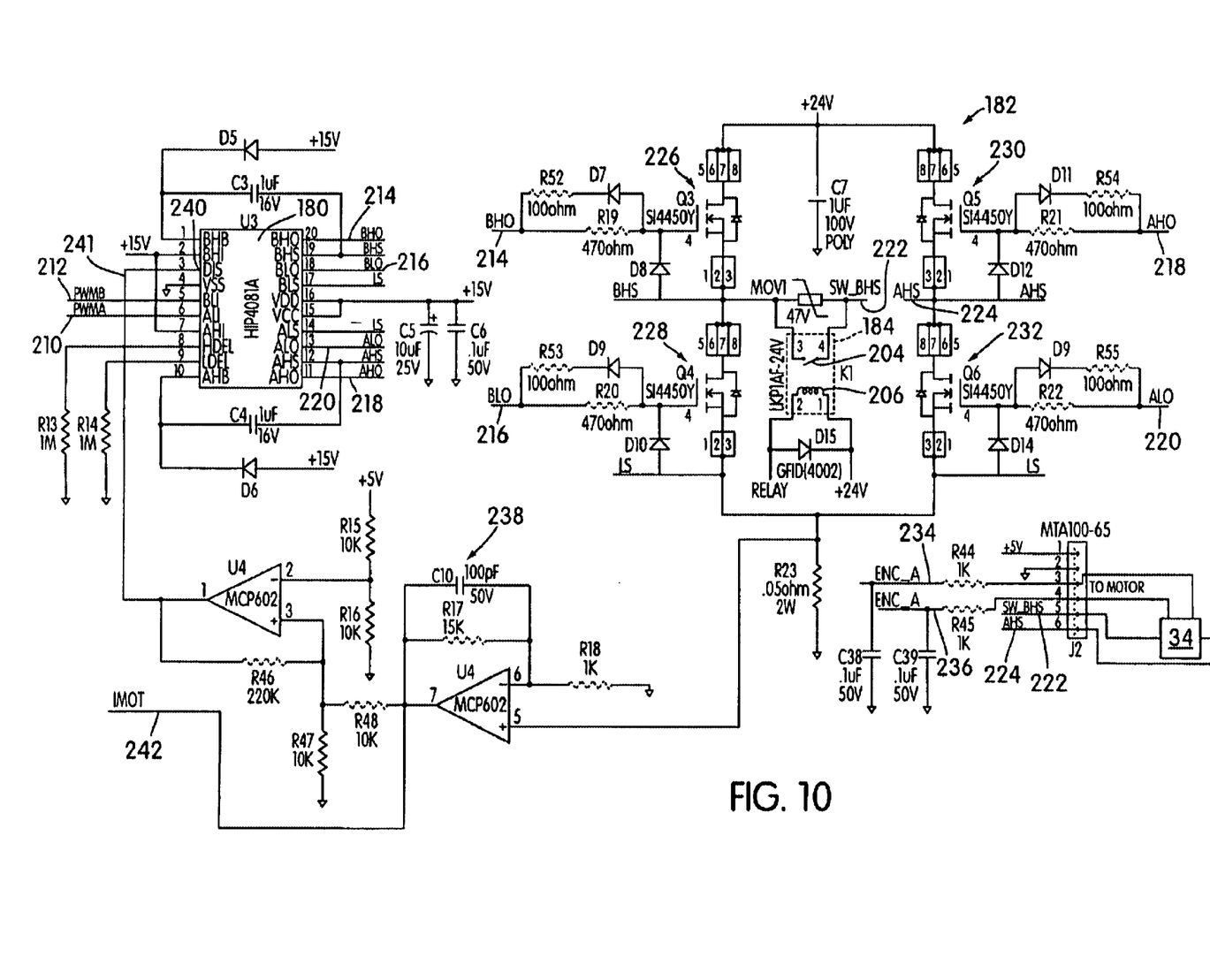

The control circuitry is shown in FIGS. 9 and 10 and includes the CPU 172, a motor drive control module or motor driver 180, an H-Bridge circuit 182 and a switch assembly in the form of a relay 184. The CPU 172 may be programmed and operated to control and monitor the door control system 12 to open and close the door panel 16 and provide fail safe door operation. The CPU 172 is communicated to a plurality of electrical circuits and circuit components including a dip switch block 186, a clock frequency generating circuit 188 which may include a crystal 190, a programming interface 192 and an LED status indicator light 194.

The control circuitry can best be understood through an example of how the circuitry can be operated to control and provide fail safe operation for a door panel. For the purposes of illustration, it will be assumed initially that the door panel is closed and that it encounters no obstructions while opening. Generally, to open the door panel, an operator sends a door open command signal to the CPU 172 either through a wireless device such as key fob 164 or through a hardwired device 196, such as infrared, Doppler or microwave motion and/or presence detector. If the key fob 164 is used, the door open command signal from the key fob 164 is received, decoded and communicated to the CPU 172 through the receiver circuit 162, the decoder microcontroller 168 and electrical line 176. If the hardwired device 196 is used, the open command signal is sent to the CPU through an electrical conductor 198 of a ribbon header 200 which may be used to electrically communicate a wide range of devices to the control circuit including the hardwired device 196.

The CPU 172 in response to receiving the open command may be programmed to respond by unlatching an electrically operated strike assembly 202 (shown schematically in FIG. 1) to unlatched the door panel 16 and then, a predetermined period of time later, close a switching element 204 in the relay 184 by causing an electrical current true flow through an inductor 206. The CPU 172 is communicated to the inductor through a transistor 208 and may cause current to flow through the inductor 206 by causing the transistor 208 to be appropriately biased. The CPU 172 may be a PIC16C73B processing chip commercially available from Microchip Technology, Inc., 2355 West Chandler Blvd., Chandler, Ariz. 85224-6199.

The CPU 172, further in response to receiving the open door command from the key fob 164, may be programmed to respond by causing control signals to be sent to the motor driver 180 over electrical lines 210, 212. The motor driver 180 may be a motor control chip such as an HIP4081A Motor Control Chip commercially available from INTERSIL. The motor driver 180 is electrically communicated to the H-Bridge by electrical conductors 214, 216, 218, 220. The motor driver 180 and the H-Bridge 182 together may comprise the motor controller electrically communicated between the CPU 172 and the electrical motor 34 and together may provide a pulse width modulated electrical power signal to the motor 34 to control motor speed and direction. It is understood, however, that this embodiment of the motor controller is exemplary only and not intended to limit the scope of the invention. The motor controller any type of device that is capable of controlling the operation (speed and direction) of the electrical motor. Motor speed and direction could be controlled, for example, by a CPU. In these embodiments, the CPU would, in effect, be considered the motor controller. The signals sent from the CPU 172 to the motor driver 180 in effect function as speed and direction reference signals for controlling the speed and rotational direction of a motor 34. In response to these signals, the motor driver 180 operates to control the speed and direction of the motor 34 through the H-Bridge 184. The H-Bridge 184 includes four transistors 226, 228, 230, 232 and associated circuitry and can be operated in a known manner to supply the pulse width modulated power signal. The H-Bridge 184 is electrically communicated to the motor 34 through electrical line 222 and through electrical line 224 from the relay 184. The lines 222, 224 are connected to the motor 34 through a ribbon connector 226.

The control circuit includes a current overload amplifier circuit generally designated 238 which provides a feedback signal from the H-Bridge 184 to a disable input or pin 240 on the motor driver 180 through conductor 241. The feedback circuit 238 operates to sample and amplify the current flowing between the H-Bridge 184 and the motor 34. If the amplitude or magnitude of the current flowing from the H-Bridge 184 to the motor 34 rises above a predetermined level, the circuit 238 will disable the motor driver 180, thereby protecting the motor driver 180, the H-Bridge 184 and the associated circuitry. The circuitry 238 also provides an external amplifier circuit which protects the motor 34 by monitoring the voltage across a resistance in series with the motor 34 (and thereby monitors a motor current). This feedback signal is communicated to the CPU 172 through transmission line 242. The detected voltage is amplified between 0 and 5 volts. The CPU 172 is programmed to evaluate the feedback voltage as a function of the position of the door panel 16 in its range of motion. This is because it is expected that there may be an increase in motor current when the door panel 16, for example, initially starts movement (and therefore may have to "break" the seal with a door seal on the door jamb) and that there will be less motor current during unobstructed movement of the door through an intermediate portion of its range of movement.

The CPU 172 may be programmed to move the door panel 16 between closed and open positions at a predetermined speed. The CPU 172 may monitor the actual speed of the motor 34 (and therefore of the door panel 16) through speed feedback signals received from the position encoder associated with the motor shaft of the motor 34. The electrical lines 234, 236 carry signals from the A and B channels, respectively, of the shaft encoder of the motor 34 to the CPU 172. The CPU 172 may be programmed to adjust the speed of the motor 34 in a closed loop fashion using an algorithm for a PID controller that may be included as part of the software program executed by the CPU 172 during door panel movement. The PID controller may generate an output pulse width modulated signal with a frequency of 20 kHz. The CPU 172 may be programmed to count the total number of rotations of the shaft of motor 34 and to use this data to calculate the position of the door within its range of movement between closed and open positions. The CPU 172 may further be programmed to utilize the door panel position information of the door panel to control the output of the motor 34 so that door panel speed is a function of door panel position. For example, when the door panel 16 has moved outwardly from the door jamb 14 in the opening direction more than 15 degrees, the CPU 172 may be programmed to limit the duty cycle of the motor 34 to approximately fifty percent of its maximum output.

The CPU 172 may be programmed to monitor the movement (i.e., speed, direction and position) of the door panel 16 as described above in connection with the diagrams of FIGS. 5 and 6. When the CPU 172 is so programmed, door panel 16 movement in the opening direction continues until the door panel 16 reaches the end of its travel path (because, for example, the door panel 16 encounters a doorstop). The CPU 172 may be programmed to shut off the door control system 12 according to the method of FIGS. 5 and 6. Thus, when the door panel 16 is fully opened and stopped against the door stop, the motor shaft will stop rotating (resulting in a cessation of signals on lines 234, 236) and the motor current may also rise. The CPU 172 may be programmed to respond to one of these events (cessation of the motor shaft rotation or increase in motor current) by (a) de-energizing the motor 34 and (b) opening the switch element 204 of the relay 184. It can be understood, for example, that which of these two events the CPU 172 is programmed to respond to may vary, depending upon the particular door assembly the CPU is controlling. For example, if the door jamb includes a resilient weather seal, the CPU 172 may be programmed to allow the motor current to rise to a relatively high level (relative to the "normal" current level measured during unobstructed door panel movement) when the door panel has closed sufficiently to contact the door seal to allow compression of the seal and subsequent latching of the door panel in its closed position. In this instance, the CPU 172 may ignore the current rise and de-energize the door system 12 in response to the cessation of motor shaft rotation for a predetermined time period. It can also be understood that the particular event which causes the CPU 172 to de-energize the door control system 12 may vary depending upon the particular door assembly being operated and on choices made by the programmer programming the CPU 172. Thus, this event is of secondary importance and it should be recalled that the focus of the present invention is the fail safe operation of the door operating system provided by the redundant actions of (1) commanding the pulse width modulator 180, 182 to stop transmitting and electrical power signal to the motor 34 and (2) opening the switch element 204 of the relay 184 to thereby open or "break" the transmission path for the energy signal between the motor controller (that is, in this particular instance between the H-Bridge) and the motor 34.

More specifically, the CPU 172 de-energizes the motor 34 by commanding the motor driver 180 of the motor controller through control lines 210, 212 to stop operating the H-Bridge 184 to drive the motor 34. The CPU 172 further responses to stop door panel movement by switching off the current to the inductor 206 of the relay 184 to open the switching element 204. It can be understood from FIGS. 9 and 10 that the switching element 204 is in series between the motor controller and the motor 34.

The fail safe nature of the door control system 12 is advantageous because, if the motor driver 180 of the motor controller fails to respond when the CPU 172 commands the same (through lines 210, 212) to de-energize the motor 34, the motor 34 will still be shut off because the CPU 172 will stop the current flow through inductor 206 and thereby cause the switch element 204 to move from its closed position through its open position.

Because the CPU 172 operates to monitor the position, direction of movement and speed of the door panel 16 and to monitor the motor current during a door panel moving operation, the CPU 172 can be adapted (either by software programming or hardwired programming) to respond to any predetermined condition that is indicative of an unsafe and/or abnormal condition that may arise during a door moving operation and thereby protect both the circuitry and any people who come in contact with the moving door panel 16. Therefore, it can be understood that the fail safe operation of the shut-off mechanism for the door control system 12 provided by the relay 184 provides fail safe operation both during routine opening and closing of the door panel 16 and in emergency situations. For example, if the door panel encounters an unexpected obstruction, there may be no encoder pulses for a predetermined period of time (as for example a half a second as used in the example program described above). In this event, the CPU 172 may respond (according to the method of FIGS. 5 and 6, for example) by commanding the motor driver 180 of the motor controller to stop communicating a power signal through the motor 34 and by opening the switch element 204 of the relay 184.

When the CPU 172 de-energizes the motor 34, the door panel 16 may go into manual mode. That is, the door control system 12 may go into manual mode by opening the switch element 204 of the relay 184 and by commanding the pulse width modulator 180, 182 to stop sending a power signal to the motor 34. Thus, the door panel 16 may go into manual mode whenever the door panel 16 is fully open, fully closed, or when a failure occurs. When the switch element 204 of the relay 184 is open, there is no electrical load on the motor. The only load on the motor 34 is provided by the transmission 38 and any frictional resistance that is provided from the linkage assembly 26. This has several advantages. For example, this reduces the resistance to door movement in manual mode making the door panel 16 easier to move manually. The opening of the switch element 204 of the relay 184 also prevents any electrical damage that may occur to the CPU 172, to the motor driver 180 (both of which may be computer "chips"), or other components of the control circuitry which may otherwise be damaged from an induced current caused by back-driving of the electric motor while moving the door panel 16 in manual mode. The CPU 172 includes an emergency stop pin 252 that may accept a signal to stop door panel movement instantly and cause the automatic door operating system to go into manual mode.

While the invention has been disclosed and described with reference with a limited number of embodiments, it will be apparent that variations and modifications may be made thereto without departure from the spirit and scope of the invention. Therefore, the following claims are intended to cover all such modifications, variations, and equivalents thereof in accordance with the principles and advantages noted herein.

What is claimed:

1. A method for controlling an electric motor of an automatic door system, said motor being operatively connected to a door panel to enable said motor to perform a door moving operation wherein said motor moves said door panel between open and closed positions thereof using an electric power signal delivered to said motor from an electric power supply, said motor being communicated to a motor controller that controls the electric power signal delivered to said motor to control said door moving operation, said door system including a redundancy cut-off switch connected between said motor and said motor controller, said redundancy cut-off switch being movable between (a) an open position disabling the delivery of the electric power signal from said motor controller to said motor and (b) a closed position enabling the delivery of the electric power signal from said motor controller to said motor through said redundancy cut-off switch, said method comprising:

while said motor controller is delivering said electric power signal to said motor through said redundancy cut-off switch in said closed position thereof to affect said door moving operation, monitoring said door moving operation for an occurrence of a predetermined condition;

responsive to detecting the occurrence of said predetermined condition, (a) causing said motor controller to terminate the delivery of said electric power signal from said electric power supply to said motor and (b) affecting movement of said redundancy cut-off switch from said closed position thereof to said open position thereof to ensure termination of the delivery of the electric power signal in the event the electric power signal is not terminated by said controller.

2. A method according to claim 1, wherein said monitoring said door moving operation comprises monitoring an amplitude of the current of the electric power signal being delivered to said motor; and wherein said predetermined condition is the amplitude of said electric power signal increasing above a predetermined level, thus indicating that movement of said door panel between said open and closed positions thereof is obstructed.

3. A method according to claim 1, wherein said monitoring said door moving operation comprises monitoring a speed at which said door panel moves between said open and closed positions thereof; and wherein said predetermined condition is when the speed at which said door panel moves between said open and closed positions thereof is greater than a predetermined level.

4. A method according to claim 3, wherein monitoring said speed at which said door panel moves between said open and closed positions thereof is performed indirectly by monitoring a speed of said motor.

5. A method according to claim 3, wherein automatic door system comprises an encoder adapted to transmit a pulse signal for each unit of door panel movement; and wherein said monitoring the speed at which said door panel moves between said open and closed positions thereof is performed by measuring a time interval between subsequent pulse signals transmitted by said encoder.

6. A method according to claim 5, wherein said encoder transmits said pulse signal for each unit of rotational movement of a rotor of said motor which is operatively connected to said door panel, thus indirectly transmitting said pulse signal for each unit of door panel movement.

7. A method according to claim 1, wherein said automatic door system further comprises a processor communicated to said motor controller, and wherein said switch is a relay comprising an inductive coil communicated to said processor and a switching element in series between said motor and said motor controller, said switching element being movable between (a) an open position disabling the delivery of the electric power signal from said motor controller to said motor to thereby provide the open position of said switch and (b) a closed position enabling the delivery of the electric power signal from said motor controller to said motor to provide the closed position of said switch, said switching element being biased to said open position thereof and being movable to said closed position thereof by an application of a switch controlling electric power signal to said coil such that applying said switch controlling electric power signal to said coil causes said switching element to move from said open position thereof to said closed position thereof and terminating the application of said switch controlling electric power signal to said coil causes said switching element to move from said closed position thereof to said open position thereof;

said monitoring said door moving operation for an occurrence of a predetermined condition being performed by said processor;

said causing said motor controller to terminate the delivery of said electric power signal from said electric power supply to said motor being performed by said processor instructing said motor controller to terminate delivery of said electric power signal responsive to said processor detecting the occurrence of said predetermined condition;

said moving said switch from said closed position thereof to said open position thereof to ensure termination of the delivery of electric power signal in the event the electric power signal is not terminated by said controller being performed by said processor terminating the application of the switch controlling electric power signal to the coil of said relay responsive to detecting the occurrence of said predetermined condition, thereby causing said switching element to move to said open position thereof to disable the delivery of the electric power signal from said motor controller to said motor.

8. A method according to claim 1, wherein said automatic door system is a sliding automatic door system with said door panel being movable generally rectilinearly between said open and said closed positions.

9. A method according to claim 1, wherein said automatic door system is a swinging automatic door system with said door panel being movable in a swinging manner between said open and closed positions.

10. A method for controlling an electric motor of an automatic door system, said motor being operatively connected to a door panel to enable said motor to perform a door moving operation wherein said motor moves said door panel between open and closed positions thereof using an electric power signal delivered to said motor from an electric power supply, said motor being communicated to a motor controller that controls the electric power signal delivered to said motor to control said door moving operation, said door system including a switch connected between said motor and said motor controller, said switch being movable between (a) an open position disabling the delivery of the electric power signal from said motor controller to said motor and (b) a closed position enabling the delivery of the electric power signal from said motor controller to said motor, said method comprising:

while said motor controller is delivering said electric power signal to said motor to affect said door moving operation, monitoring said door moving operation for an occurrence of a predetermined condition;

responsive to detecting the occurrence of said predetermined condition, (a) causing said motor controller to terminate the delivery of said electric power signal from said electric power supply to said motor and (b) affecting movement of said switch from said closed position thereof to said open position thereof to ensure termination of the delivery of the electric power signal in the event the electric power signal is not terminated by said controller;

wherein said monitoring said door moving operation comprises monitoring an amplitude of the current of the electric power signal being delivered to said motor; and wherein said predetermined condition is the amplitude of said electric power signal increasing above a predetermined level, thus indicating that movement of said door panel between said open and closed positions thereof is obstructed.

11. A method for controlling an electric motor of an automatic door system, said motor being operatively connected to a door panel to enable said motor to perform a door moving operation wherein said motor moves said door panel between open and closed positions thereof using an electric power signal delivered to said motor from an electric power supply, said motor being communicated to a motor controller that controls the electric power signal delivered to said motor to control said door moving operation, said door system including a switch connected between said motor and said motor controller, said switch being movable between (a) an open position disabling the delivery of the electric power signal from said motor controller to said motor and (b) a closed position enabling the delivery of the electric power signal from said motor controller to said motor, said method comprising:

while said motor controller is delivering said electric power signal to said motor to affect said door moving operation, monitoring said door moving operation for an occurrence of a predetermined condition;

responsive to detecting the occurrence of said predetermined condition, (a) causing said motor controller to terminate the delivery of said electric power signal from said electric power supply to said motor and (b) affecting movement of said switch from said closed position thereof to said open position thereof to ensure termination of the delivery of the electric power signal in the event the electric power signal is not terminated by said controller;

wherein said monitoring said door moving operation comprises monitoring a speed at which said door panel moves between said open and closed positions thereof; and wherein said predetermined condition is when the speed at which said door panel moves between said open and closed positions thereof is greater than a predetermined level.

12. A method according to claim 11, wherein monitoring said speed at which said door panel moves between said open and closed positions thereof is performed indirectly by monitoring a speed of said motor.

13. A method according to claim 11, wherein automatic door system comprises an encoder adapted to transmit a pulse signal for each unit of door panel movement; and wherein said monitoring the speed at which said door panel moves between said open and closed positions thereof is performed by measuring a time interval between subsequent pulse signals transmitted by said encoder.

14. A method according to claim 13, wherein said encoder transmits said pulse signal for each unit of rotational movement of a rotor of said motor which is operatively connected to said door panel, thus indirectly transmitting said pulse signal for each unit of door panel movement.

15. A method for controlling an electric motor of an automatic door system, said motor being operatively connected to a door panel to enable said motor to perform a door moving operation wherein said motor moves said door panel between open and closed positions thereof using an electric power signal delivered to said motor from an electric power supply, said motor being communicated to a motor controller that controls the electric power signal delivered to said motor to control said door moving operation, said door system including a switch connected between said motor and said motor controller, said switch being movable between (a) an open position disabling the delivery of the electric power signal from said motor controller to said motor and (b) a closed position enabling the delivery of the electric power signal from said motor controller to said motor, said method comprising:

while said motor controller is delivering said electric power signal to said motor to affect said door moving operation, monitoring said door moving operation for an occurrence of a predetermined condition;

responsive to detecting the occurrence of said predetermined condition, (a) causing said motor controller to terminate the delivery of said electric power signal from said electric power supply to said motor and (b) affecting movement of said switch from said closed position thereof to said open position thereof to ensure termination of the delivery of the electric power signal in the event the electric power signal is not terminated by said controller;

wherein said automatic door system further comprises a processor communicated to said motor controller, and wherein said switch is a relay comprising an inductive coil communicated to said processor and a switching element in series between said motor and said motor controller, said switching element being movable between (a) an open position disabling the delivery of the electric power signal from said motor controller to said motor to thereby provide the open position of said switch and (b) a closed position enabling the delivery of the electric power signal from said motor controller to said motor to provide the closed position of said switch, said switching element being biased to said open position thereof and being movable to said closed position thereof by an application of a switch controlling electric power signal to said coil such that applying said switch controlling electric power signal to said coil causes said switching element to move from said open position thereof to said closed position thereof and terminating the application of said electric power signal to said coil causes said switching element to move from said closed position thereof to said open position thereof;

said monitoring said door moving operation for an occurrence of a predetermined condition being performed by said processor;

said causing said motor controller to terminate the delivery of said electric power signal from said electric power supply to said motor being performed by said processor instructing said motor controller to terminate delivery of said electric power signal responsive to said processor detecting the occurrence of said predetermined condition;

said moving said switch from said closed position thereof to said open position thereof to ensure termination of the delivery of electric power signal in the event the electric power signal is not terminated by said controller being performed by said processor terminating the application of the switch controlling electric power signal to the coil of said relay responsive to detecting the occurrence of said predetermined condition, thereby causing said switching element to move to said open position thereof to disable the delivery of the electric power signal from said motor controller to said motor.

* * * * *